United States Patent [19]

Konishi et al.

[11] Patent Number: 4,741,948
[45] Date of Patent: May 3, 1988

[54] COMPOSITE RELEASE SHEET MATERIAL

[75] Inventors: Toshiharu Konishi; Hadekazu Takashashi; Yoshitsugu Hasegawa; Kazunori Yamamoto; Kenji Sano; Hideyuki Okada, all of Osaka, Japan

[73] Assignee: Nitto Electric Industrial Co., Ltd., Osaka, Japan

[21] Appl. No.: 845,299

[22] Filed: Mar. 28, 1986

[30] Foreign Application Priority Data

May 23, 1985 [JP] Japan ............................ 60-76821[U]

[51] Int. Cl.⁴ ............................................. B32B 7/02
[52] U.S. Cl. .................................. 428/215; 428/339; 428/423.1; 428/423.7; 428/447; 428/480; 428/483
[58] Field of Search ................. 428/40, 172, 332, 333, 428/339, 352, 354, 446, 451, 423.7, 424.2, 480, 483

[56] References Cited

U.S. PATENT DOCUMENTS

| | | | |
|---|---|---|---|
| 3,971,866 | 7/1976 | Johnson | 428/40 |
| 4,175,156 | 11/1979 | Ikeno | 428/354 |
| 4,234,644 | 11/1980 | Blake et al. | 428/215 |
| 4,386,135 | 5/1983 | Campbell et al. | 428/354 |
| 4,521,471 | 6/1985 | Merrill | 428/40 |

FOREIGN PATENT DOCUMENTS

| | | | |
|---|---|---|---|
| 0024475 | 3/1981 | Japan | 428/354 |
| 641481 | 2/1984 | Switzerland . | |
| 564184 | 7/1977 | U.S.S.R. | 428/354 |

Primary Examiner—James J. Bell
Attorney, Agent, or Firm—Sughrue, Mion, Zinn, Macpeak & Seas

[57] ABSTRACT

A composite release sheet material comprising a thermoplastic low-adhesive thin layer having a thickness of at least 5 μm and a synthetic resin film layer having a greater tensile strength than the thin layer and, if desired, an anchor coat layer therebetween is disclosed. The composite release sheet material has an improved dimensional stability.

17 Claims, 1 Drawing Sheet

COMPOSITE RELEASE SHEET MATERIAL

FIELD OF THE INVENTION

This invention relates to a composite release sheet material, and more particularly to a composite release sheet material for a double-side adhesive sheet having an improved dimensional stability.

BACKGROUND OF THE INVENTION

A conventional adhesive material for electronic parts has been produced by the method as shown in FIG. 5, in which a base material 4 comprising a release sheet 41 having laminated thereon a double-side adhesive sheet 42 is passed under Thomson blade 5 whereby only the double-side adhesive sheet is cut to prescribed dimensions accurately corresponding to the shape of an adherent, and an unnecessary part 421 of the double-side adhesive sheet is removed from the release sheet 41 with double-side adhesive pieces 420 having a prescribed shape remaining on the release sheet with given spacings between them, which are then wound up together with a synthetic paper 6 for separation.

The thus produced adhesive material is used for adhesion in the manner shown in FIG. 6, in which an adhesive material A is continuously unwound at a constant speed, and double-side adhesive pieces 420 are transferred to adherends 7 that are forwarded at regular time intervals.

In the above-described adhesion system, a strict dimensional accuracy is required for the spacing between the double-side adhesive pieces. Any disorder in the prescribed spacing would result in failure to exacty adhere each of the double-side adhesive pieces to each adherend.

A polyethylene film is considered a promising candidate for a release sheet because of its good release property and dimensional stability against moisture. However, the polyethylene film has a small Young's modulus in tension so that a release sheet solely made of polyethylene is extended during cutting of the double-side adhesive sheet with a Thomson blade, readily resulting in disordered length of intervals between adhesive cut pieces.

U.S. Pat. No. 3,971,866 discloses a liner comprising a polyethylene film having formed thereon a reinforcing layer. This liner is composed of a thermoplastic resin layer having specific physical properties and a thermoplastic resin reinforcing layer having specific physical properties. The tensile load required for 10% elongation of this liner in tension at 325° F. is about 3 psi/in or less. This liner is expected to be useful as a protective material for, for example, an ABS resin film having provided thereon an adhesive layer, and is exposed to heating such as vacuum molding together with the ABS resin. This is the reason for such a high elongation of the liner proposed in the aforesaid U.S. patent.

In order to eliminate the warpage of the release sheet due to elongation, it has been proposed to provide a silicone type release layer on one side of a polyester film.

However, since polyester has a great hardness, the impact applied during the cutting of the doulbe-side adhesive sheet with a Thomson blade is directly given to the interface between the polyester film and the silicone type release layer without being adsorbed, thus reducing the adhesion between the silicone type release layer and the polyester film. As a result, the double-side adhesive pieces tend to be accompanied with the silicone type release layer upon transferring to adherends so that it is impossible to adhere the surface of the double-side adhesive sheet pieces.

SUMMARY OF THE INVENTION

Accordingly, an object of this invention is to provide a composite release sheet material which has a satisfactory release property and keeps a sufficiently constant interval between cut pieces of double-side adhesive sheet.

Another object of this invention is to provide a composite release sheet material having a tensile strength sufficient to stably support a silicone type release layer thereon even when a cutting impact is applied thereto.

The above objects can be accomplished by a composite release sheet material comprising a thermoplastic low-adhesive thin layer having a thickness of at least 5 μm and a synthetic resin film layer having a greater tensile strength than the thin layer, and if desired, an anchor coat layer therebetween.

BRIEF DESCRIPTION OF THE ACCOMPANYING DRAWINGS

FIG. 1 shows a basic structure of the composite release sheet material in accordance with the present invention;

FIGS. 2 to 4 each shows an another embodiment of the composite release sheet material according to the present invention;

DETAILED DESCRIPTION OF THE INVENTION

The present invention will be illustrated in detail with reference to the accompanying drawings.

Figure 1:
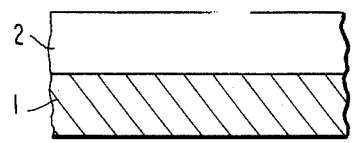
Figure 2:
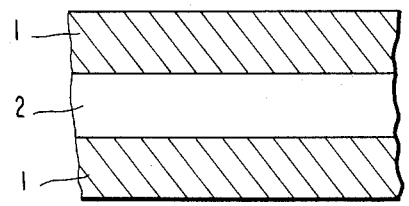
Figure 3:
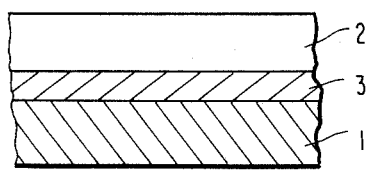

In FIGS. 1 to 3, the numeral 1 indicates a thermoplastic low-adhesive thin layer; 2 indicates a synthetic resin film layer having a greater tensile strength than the thin layer 1; and 3 indicates an anchor coat layer.

The thermoplastic low-adhesive thin layer 1 comprises a polyolefin resin, e.g., polyethylene, polypropylene, an ethylene copolymer, etc. or a mixture thereof, with polyethylene having a density of from 0.915 to 0.935 g/cm$^3$ being preferred. The thin layer has a thickness of at least 5 μm, and preferably from 8 to 100 μm.

A material for the synthetic resin film layer 2 is not particularly restricted so long as the tensile strength of the synthetic resin film is greater than that of the polyolefin resin or mixture thereof constituting the thin layer 1. However, a polyester film typically exemplified by a polyethylene terephthalate film is particularly preferred. The synthetic resin film layer preferably has a thickness of from 10 to 500 μm.

The anchor coat layer 3, which can be provided if desired, comprises polyurethane resins, acrylic resins containing an isocyanate compound (i.e., a compound containing a isocyanate group), and the like, and has a thickness of from 0.1 to 30 μm.

The thin layer 1 and the synthetic resin film layer 2 may be adhered with the anchor coat layer 3 which is interposed therebetween as shown in FIG. 3, or bounded by co-extrusion, limination, and the like.

In order to prevent deviation from a prescribed interval between adhesive pieces upon cutting of the adhesive sheet on the composite release sheet material to prescribed dimensions, it is preferred that the composite release sheet material comprising the thin layer 1 and the synthetic resin film 2 has a tensile load from 10% elongation at 160° C. of at least 0.53 kg/cm, and preferably from 0.55 to 10 kg/cm.

Figure 4:
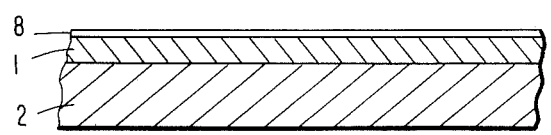
Figure 5:
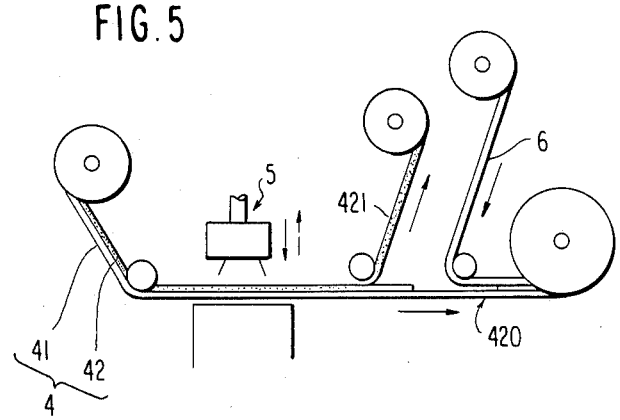
FIG. 5 shows a conventional system for producing an adhesive material.
Figure 6:
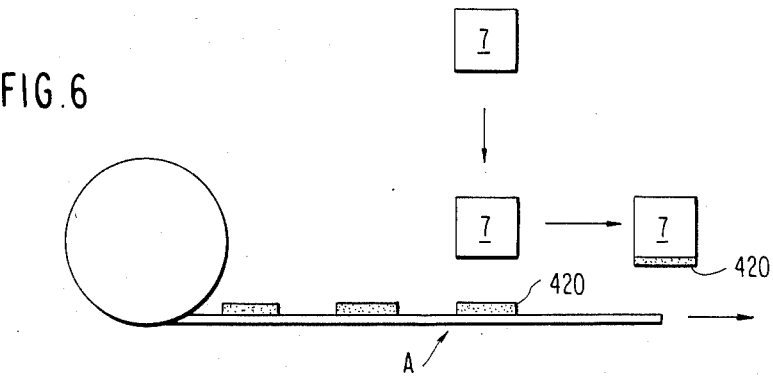
FIG. 6 shows a conventional system for using the adhesive material produced by the system shown in FIG. 5.

FIG. 4 illustrates another embodiment of this invention, in which a release layer 8 is provided on the thin layer 1. It can be seen that the thin layer 1 of FIGS. 1 or 2 may also have a release layer 8 thereon.

The release layer 8 can be made of any of silicone resins, fluorine-containing resins, paraffinic hydrocarbons, and the like. The release layer usually has a thickness of from 0.1 to 3 µm. The silicone resins which can be used include light releasable silicone resins, such as a vinyl-modified polydimethylsiloxane-based thermosetting release agent having a molecular weight of about 10,000 and a heavy releasable silicone resins, such as a mixture comprising the above-described vinyl-modified polydimethylsiloxane having a molecular weight of about 10,000 and 30% by weight of a silicone resin having a molecular weight of about 5,000. When the release layer is formed on both sides of the composite material of the present invention, one of them may be made of a light releasable silicone resin, with the another being made of a heavy releasable silicone resin.

Since the composite release sheet material according to the present invention uses a polyethylene layer having an excellent releasability as a release layer, the transfer of cut pieces of the double-side adhesive sheet onto adherends can be smoothly carried out. Further, use of the synthetic resin film having superior dimensional stability against tension to the polyethylene as a support makes it possible to maintain spacings between the double-side adhesive cut pieces constant without any warpage, thus surely preventing off-the-place adhesion. Furthermore, the impact applied onto the surface of the release sheet can sufficiently be absorbed by the thin layer which undergoes only low deformation under stress because of its low Young's modulus so that reduction in bonding strength between the release layer and the support film can sufficiently be prevented.

Thus, the composite release sheet material according to the present invention can be subjected to cutting with a Thomson blade, etc. that gives an impact without any problem as encountered in the conventional release sheets.

The present invention will now be illustrated in greater detail by reference to the following examples, but it should be understood that they are not limiting the present invention.

EXAMPLE 1

A polyethylene film having a density of 0.923 g/cm³ and a thickness of 15 µm was laminated on a 25 µm thick polyethylene terephthalate film with a 5 µm thick anchor coat layer of a polyurethane resin therebetween to prepare a composite film. A vinyl-modified polydimethylsiloxane-based thermosetting release agent having a molecular weight of 10,000 was then coated on the polyethylene film layer in a thickness of 1 µm, followed by heatign to cure the release agent.

The surface of the release layer was rubbed with a finger, and a peel strength to an acrylic adhesive tape was measured both before and after the rubbing. It was found that the peel strength in both cases was between 11 g/50 mm and 13 g/50 mm.

The tensile load required for 10% elongation of this composite release sheet material was 0.6 kg/cm.

For comparison, a composite releae sheet material was prepared in the same manner as described above but coating the release agent directly on the polyethylene terephthalate film without providing the polyethylene film layer. When the release layer was rubbed in the same manner as above, the peel strength after the rubbing reached 1,500 g/50 mm or more, while that before the rubbing was 8 g/50 mm.

EXAMPLE 2

A composite release sheet material was prepared in the same manner as described in Example 1 but using a release agent consisting of a vinyl-modified polydimethylsiloxane having a molecular weight of 10,000 and 20% by weight of a silicone resin having a molecular weight of 5,000. The peel strength of the resulting composite release sheet material was from 40 to 42 g/50 mm before and after the rubbing respectively.

For comparison, a composite release sheet material was prepared in the same manner as above but coating the release agent directly on the polyethylene terephthalate film without providing a polyethylene film layer. The peel strength after the rubbing reached 1,500 g/50 mm or more, while that before the rubbing was 42 g/50 mm.

EXAMPLE 3

A polyethylene film having a density of 0.923 g/cm³ and a thickness of 15 µm was laminated on both sides of a 35 µm thick polyethylene terephthalate film with an anchor coat layer of a polyurethane resin having a thickness of 5 µm being interposed therebetween to thereby prepare a composite film. A vinyl-modified polydimethylsiloxane thermosetting release agent having a molecular weight of 10,000 was coated on one side of the polyethylene film layer in a thickness of 1 µm, followed by heating to cure the release agent.

The peel strength of the resulting composite release sheet material to an acrylic adhesive tape after heating at 70° C. for 5 hours was 15 g/50 mm before rubbing the release layer with a finger, and 17 g/50 mm after rubbing.

For comparison, a composite release sheet material was prepared in the same manner as described above but coating the release layer directly on the polyethylene terephthalate film without using the polyethylene film layer. The peel strength after the rubbing reached 1,500 g/50 mm or more, while that before the rubbing was 18 g/50 mm.

The tensile load required for 10% elongation at 160° C. was 0.85 kg/cm.

EXAMPLE 4

A composite release sheet material was prepared in the same manner as in Example 1 but using a thermosetting release agent consisting of a vinyl-modified polydimethylsiloxane having a molecular weight of 10,000 and 30% by weight of a silicone resin having a molecular weight of 5,000.

The peel strength of the resulting composite release sheet material before and after rubbing with a finger was between 48 to 54 g/50 mm.

For comparison, a composite release sheet material was prepared in the same manner as described above but coating the release agent directly on the polyethylene terephthalate film without using the polyethylene film layer. The peel strength after rubbing reached 1,500 g/50 mm or more, while that before rubbing was 18 g/50 mm.

While the invention has been described in detail and with reference to specific embodiments thereof, it will be apparent to one skilled in the art that various changes and modifications can be made therein without departing from the spirit and scope thereof.

What is claimed is:

1. A composite release sheet material comprising a low-adhesive polyolefin resin thin layer having a thickness of at least 5 μm and a polyester film layer having a greater tensile strength than said thin layer.

2. A composite release sheet material as in claim 1, wherein said sheet material is further comprised of an anchor coat layer between said low-adhesive polyolefin resin thin layer and said polyester film layer.

3. A composite release sheet material as in claim 1, wherein said low-adhesive polyolefin resin thin layer has a thickness of from 8 to 100 μm.

4. A composite release sheet material as in claim 1, wherein said polyolefin resin is a polyethylene resin.

5. A composite release sheet material as in claim 4, wherein said polyethylene resin has a density of from 0.915 to 0.935 g/cm$^3$.

6. A composite release sheet material as in claim 2, wherein said anchor coat layer has a thickness of from 0.1 to 30 μm.

7. A composite release sheet material as in claim 2, wherein said anchor coat layer comprises a polyurethane resin or an acrylic resin containing an isocyanate.

8. A composite release sheet material as in claim 1, wherein said polyester film layer has a thickness of from 10 to 500 μm.

9. A composite release sheet material as in claim 1, wherein said polyester is polyethylene terephthalate.

10. A composite release sheet material as in claim 1, having a tensile load for 10% elongation at 160° C. of at least 0.53 kg/cm.

11. A composite release sheet material as in claim 10, having a tensile load for 10% elongation at 160° C. of from 0.55 to 10 kg/cm.

12. A composite release sheet material as in claim 1, where said low-adhesive polyester film layer is interposed between polyolefin resin thin layers.

13. A composite release sheet material as in claim 1, wherein the surface of said low-adhesive polyolefin resin thin layer is coated with a release layer.

14. A composite release sheet material as in claim 2, wherein the surface of said low-adhesive polyolefin resin thin layer is coated with a release layer.

15. A composite release sheet material as in claim 13, wherein said release layer has a thickness of from 0.1 to 3 μm.

16. A composite release sheet material as in claim 14, wherein said release layer has a thickness of from 0.1 to 3 μm.

17. A composite release sheet material as in claim 13, wherein said release layer comprises a silicone resin, a fluorine-containing resin, or a paraffinic hydrocarbon.

* * * * *